United States Patent [19]

Solaroli

[11] Patent Number: 4,856,547
[45] Date of Patent: Aug. 15, 1989

[54] PRESSURE RELIEF VALVE

[76] Inventor: Alberto Solaroli, P.O. Box 2717, Station F, Scarborough, Ontario, Canada, M1W 3P3

[21] Appl. No.: 306,300

[22] Filed: Feb. 3, 1989

[51] Int. Cl.$^4$ .................. F16K 17/06; F16K 17/38
[52] U.S. Cl. ............................. 137/73; 137/79; 137/527.6
[58] Field of Search .............. 137/73, 79, 527, 527.6; 251/336, 337

[56] References Cited

U.S. PATENT DOCUMENTS

| | | | |
|---|---|---|---|
| 2,036,391 | 4/1936 | Bradley | 137/73 |
| 2,444,130 | 6/1948 | Crowe | 236/92 |
| 2,480,986 | 9/1949 | Walker | 236/92 |
| 2,564,295 | 8/1951 | Renz et al. | 137/68 |
| 2,647,534 | 8/1953 | Freeman | 137/527.6 X |
| 2,767,735 | 10/1956 | Darling | 137/527 |
| 3,455,316 | 7/1969 | Rogers | 137/73 |
| 3,789,874 | 2/1974 | Hills | 137/527 |
| 4,099,551 | 7/1978 | Billington et al. | 137/73 X |
| 4,458,711 | 7/1984 | Flider | 137/71 |
| 4,732,188 | 3/1988 | Gabrlik et al. | 137/73 |

OTHER PUBLICATIONS

"A Study of Pressure Tank Car Safety Relief Valve Sizing Requirements", Jan. 18, 1983, Association of American Railroads.
"Safety Relief Valve Literature Search & Synthesis", Report No. 81-6, Aug. 1981, Canadian Institute of Guided Ground Transport.
"Lyons Valve Designers Handbook", Van Nostrand, 1982, Ed. J. Lyons, pp. 92-101 and 125-131.

Primary Examiner—John Rivell
Attorney, Agent, or Firm—Ridout & Maybee

[57] ABSTRACT

A pressure relief valve, for pressurised fluid storage vessels such as a rail tank car for volatile liquids, has a flap valve for rotational movement in a valve passage between a closed position seated on a valve seat and blocking the passage and an open position in which the passage is substantially unobstructed. A spring arrangement for keeping the valve closed against a rated pressure includes an externally mounted spring system which, when exposed to fire conditions which might threaten the wall strength of the vessel, loses spring temper so as to reduce the closing pressure of the valve.

10 Claims, 2 Drawing Sheets

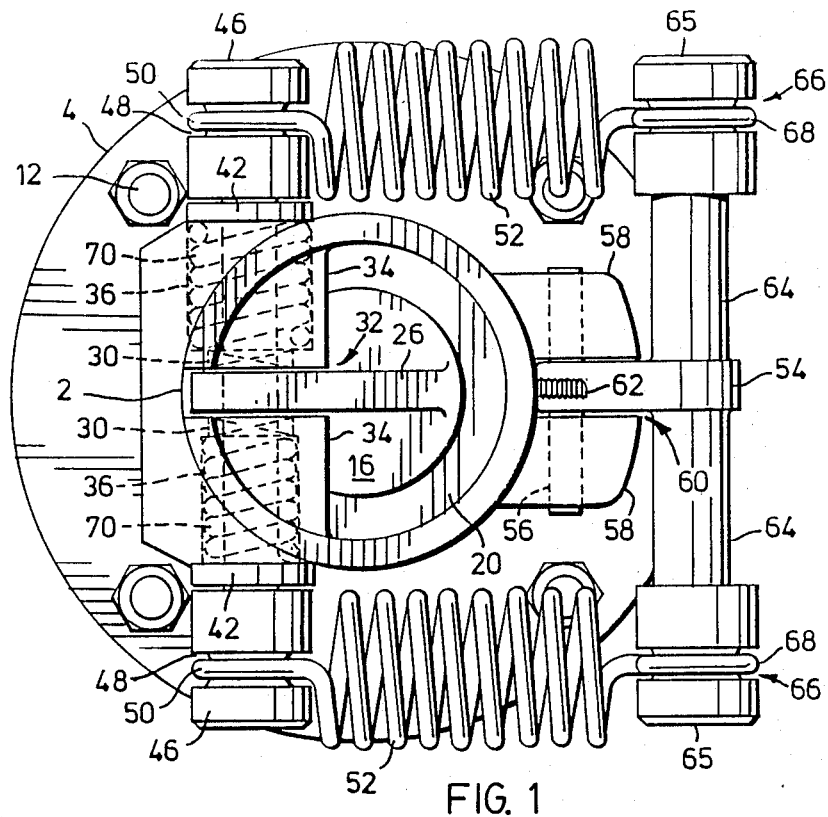
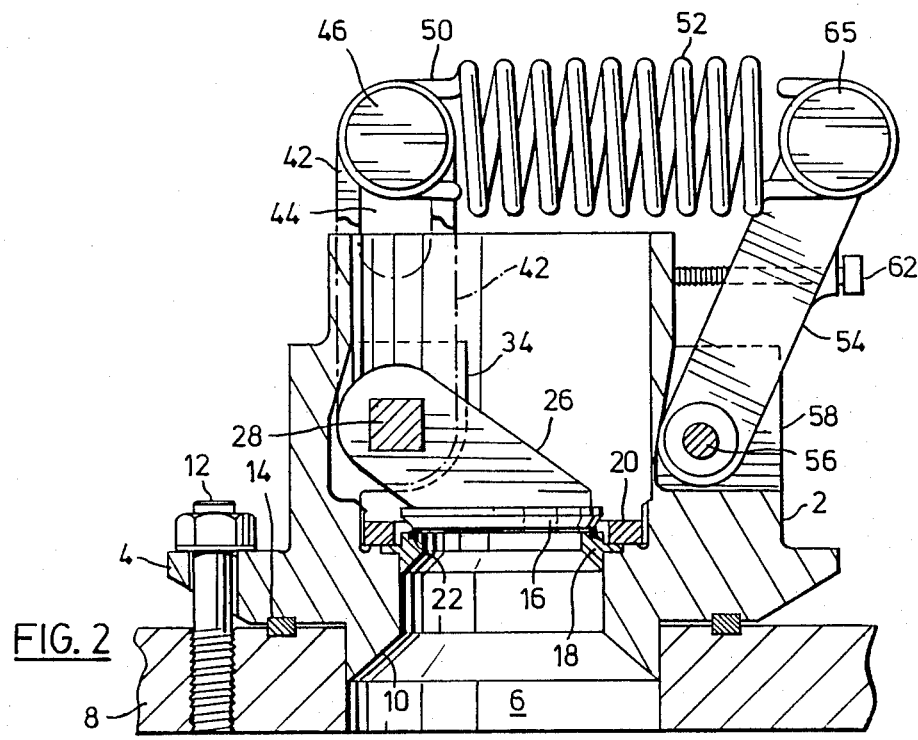
FIG. 1
FIG. 2

4,856,547

PRESSURE RELIEF VALVE

FIELD OF THE INVENTION

This invention relates to pressure relief valves for vessels containing pressurised fluids.

BACKGROUND OF THE INVENTION

The hazards presented in the event of fire by large vessels containing pressurised fluids, particularly flammable fluids, such as railcars for the conveyance of liquefied petroleum gases, are well known. The pressure within such a vessel when subject to external heat, such as that due to an external fire, will rise, whilst the temperature of the walls of the vessels, particularly in areas not in contact with liquid contents of the vessel, may rise to a level at which their structural strength is sufficiently reduced to result in catastrophic failure to sustain the increased pressure within the vessel. Since such fires commonly arise following an accident such as a derailment, the orientation of the vessel when required to sustain such abnormal position is not predictable.

Whilst various proposals have been made with a view to reducing these hazards, the desirability of fitting such vessels with an effective pressure relief valve is widely recognized. The performance requirements for such a valve are onerous, since it must be capable of providing an adequate rate of fluid flow under a wide range of emergency conditions. It must also retain a reclosure capability such as to restrain unnecessary continuation of venting of the contents of a vessel when its internal pressure has fallen to an acceptable level, even after exposure to extreme temperatures. This acceptable pressure level should be substantially reduced in the case of a vessel which has been exposed to extreme temperatures to take account of the weakening of the vessel walls which may have occurred. According to circumstances, and the orientation of the vessel during venting, the valve may be required to pass gas, liquid, or a mixture of gas and liquid. For a given opening, the rate of volume discharge of gas will be much higher than that for liquid or liquid/gas mixtures. The valve must of course be gas and fluid tight under non-emergency conditions Conventional pressure relief valves for this type of application have usually been of the poppet type, and rated for a desired vapour discharge rate. The configuration of a poppet valve is such as inherently to limit the valve opening which can be achieved within a valve body of given size, and the difference between opening and closing pressures is fixed by the design of the valve and generally quite small

SUMMARY OF THE INVENTION

It is an object of the present invention to provide relief valve for use in applications as discussed above, which can be constructed to have desirable opening and closing characteristics, and which will respond to exposure to excessive temperatures by reducing its closing pressure.

According to the invention, an emergency pressure relief valve for a vessel containing pressurised fluid comprises a valve body defining a valve passage through the body from a first end communicable with the interior of the vessel to a second end communicable with the ambient atmosphere, a valve seat surrounding the passage, a flap valve, a shaft supporting the flap valve for rotation about an axis perpendicular to a longitudinal axis of the passage between a first position closing the passage and in fluid tight engagement with the valve seat and a second position within the body in which it does not substantially obstruct the passage, and spring means acting between the shaft and the body to urge the flap valve into said first position with a torque sufficient to retain the flap valve in said first position when the pressure difference between the first and second ends of the passage is less than a predetermined value, said spring means including a spring disposed for exposure to the thermal ambience of the vessel to which the valve is applied, the spring being made of a material which loses its spring temper on exposure to a thermal ambience likely to result in substantial weakening of walls of the pressure vessel, whereby substantially to reduce the total closing torque applied by said spring means to the valve after exposure of the spring to such a thermal ambience.

Preferably the spring means comprises multiple springs acting in parallel on said flap including a first spring which is the spring exposed to the thermal ambience of the vessel, and at least one further spring sufficiently protected from the thermal ambience of the vessel to maintain a predetermined minimum closing torque on said flap valve after said first spring has lost its spring temper.

Further features of the invention will become apparent from the following description of a presently preferred embodiment.

IN THE DRAWINGS

FIG. 1 is a plan view of a valve in accordance with the invention; and

FIG. 2 is a part elevational and part vertical sectional view of the valve, in a closed condition.

DESCRIPTION OF THE PREFERRED EMBODIMENT

Figure 3:
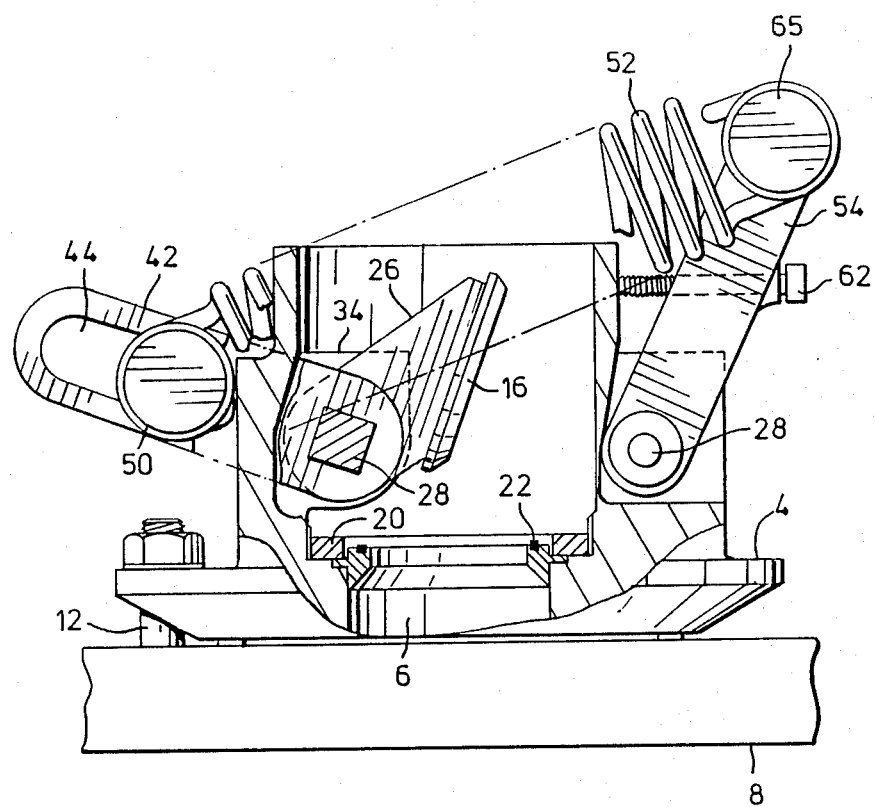
FIG. 3 is a view similar to that of FIG. 2, showing the valve in a partially opened condition.

Referring to the drawings, a relief valve has a body 2 with a flange 4 attached over an orifice 6 in the exterior wall 8 of the vessel for containing pressurised fluid, typically a tank car conveying liquefied petroleum gas or other volatile flammable and/or toxic liquid. In order to obtain a good seal between the valve and the tank wall, a flange 10 on the valve enters the orifice 6, the flange 4 is secured by bolts 12 to the wall 8, and a seal 14 is provided between the wall 8 and the flange 4.

The valve body defines a longitudinal passage 14 which is normally closed by a flap valve 16 engaging a valve seat 18 secured within the passage 14 by a nut 20. A gas tight seal between the valve 16 and the seat 18 is assured by an O-ring 22 located in a groove in the seat, but the arrangement is such that substantial sealing of the valve can take place even in the absence of the O-ring. The flap valve 16 is supported by an arm 26 on a shaft 28 extending perpendicular to the longitudinal axis of the passage and to one side of it. The shaft 28 is supported by bearings 30 to either side of a vertical slot 32 which accommodates the arm 26 when the flap valve is open and is formed in a first thickened portion 34 of the valve body 2 above the valve seat 18. The thickened portion 34 oblates the portion of the passage 14 above the seat such that the cross sectional area of the passage, when the flap valve 16 is fully open and lying against the portion 34 (see FIG. 3), the cross-sectional area of the passage is more or less constant from the valve seat upwards.

The bearings 30 for the shaft 28 are located at the inner ends of bores 36 in the portion 34. Housed within the bores 36 and coaxial with the shaft 28 are torsion springs 70, anchored at their one ends to the shaft and at their other ends to the body 2, the springs being preloaded so as to apply a predetermined closing torque to the flap valve 16, tending to maintain it in sealing engagement with the valve seat 18 against the pressure of the contents of the vessel. As the valve opens, the springs will exert a gradually increasing closing torque on the valve. The shaft and spring are retained in situ by and crank arms 42 secured to each end of the shaft.

Each crank arm 42, which extends vertically when the valve is closed, is formed with a longitudinal slot 44 at its distal end within which is retained a sliding boss 46 formed with a groove 48 which engages an end loop 50 of a tension spring 52. A second arm 54 is supported for pivotal movement relative to the body by a pivot pin 56 extending parallel to the shaft 28 through a thickened portion 58 of the body on the opposite side to the thickened portion 34, the lower end of the arm being accommodated in a slot 60 in this thickened portion. A minimum inclination of this arm to the vertical axis of the body is maintained by a set screw 62 acting on a wall of the body above the thickened portion 58. A cross bar 64 at the distal end of the arm 54 carries at each end fixed bosses 65 formed with grooves 66 which engage opposite end loops 68 of the springs 52. The arms 42 and 54 are offset laterally with respect to the body so that the spring 52 is supported clear of the latter.

In use, the set screw 62 is adjusted so that the sum of the closing forces exerted by the springs 52 and 70 in the valve 16 is such that the valve will not commence to open unless the pressure within the vessel exceeds a predetermined value, for example 250 pounds per square inch. Typically the majority, for example 60–80%, of this closing force will be exerted by the spring 52, the balance being provided by the springs 70. As pressure continues to rise within the vessel, the valve opens further, and the return force applied by the springs initially increases. However, the arms 42 move increasingly away from the vertical as the flap valve opens, until the bosses 46 slide down the slots 44, thus reducing the effective leverage of the arms, which leverage is ultimately further reduced by the decreasing angle included between the spring and the arm. This reduced leverage produces the effect that once a certain degree of opening of the valve is obtained, the valve will then move to the fully open position without further increase in pressure within the vessel. This is a desirable characteristic in relief valves, since minor venting of excess pressure can occur without full opening of the valve, whilst full opening of the valve can be obtained under emergency conditions without substantial overpressure. The approximately constant and substantially unobstructed cross section of the valve passage when the valve is open assists in maximizing the flow of either gas or liquid through a valve of given dimensions when the valve is open. Closing characteristics of the valve will normally be the inverse of those described for opening.

Under conditions of extreme temperature, for example when the vessel is involved in a serious fire, the spring 52 serves an additional function. Any fire involving the vessel in a manner likely to threaten the structural integrity of its walls, whether due to combustion of material not originating from the vessel, or combustion of material vented from the vessel, will probably also impinge on the spring 52, which is supported clear of the valve body and in a manner such as provides a considerable degree of thermal isolation from the remainder of the valve structure. The spring will thus respond to the application of combustion heat with relatively little thermal inertia and, in the presence of combustion conditions such as to seriously threaten the integrity of the vessel by weakening its walls, will reach a temperature such that, with suitable choice of spring material, the latter will lose some or all of its spring temper. Consequently, the closing force applied to the valve will be reduced, thus also reducing the effective opening pressure of the valve, and permitting the vessel to be vented down to a pressure which can be safely sustained even if its wall strength has been thermally impaired. At the same time, the springs 70 are enclosed within the valve body adjacent the passage 14, where they are protected from direct thermal exposure, and will be cooled by gas or liquid passing through the passage 14. Assuming normal grades of spring steel, these springs should retain their spring temper even under fire conditions for at least as long as any pressurised fluid remains in the vessel, and are thus available to provide reclosing of the valve in the event that unrestricted venting is no longer required to maintain the internal pressure of the vessel at a safe level. At this point the O-ring 22 may have been destroyed if the temperature of the valve seat rises above the decomposition or melting point of the O-ring material despite the cooling effect of fluid passing through the valve, but a substantial degree of closure will be obtained through metal-to-metal contact between the valve and the seat. The closing pressure applied by the secondary springs is preferably selected having regard to the characteristics of a fluid being contained so that it is at least equal to the vapour pressure of the fluid at some moderately elevated temperature, thus permitting reclosure of the valve as the temperature of the remaining fluid in the vessel falls below that temperature.

The installed valve may be protected by a metal or plastic cover or shroud so as to avoid foreign matter from entering the valve mechanism, and to prevent tampering with the set screw 62 which determines the initial opening pressure of the valve. Such a cover should be designed so that it will be blown off or open in the event of any substantial opening of the valve, and will not offer any significant protection to the spring 52 from fire exposure in the event of a serious fire enveloping the vessel.

The above described embodiment is exemplary only, and various modifications are possible within the scope of the appended claims. For example, the spring 52 and associated parts may be present upon only one side of the body, although the duplication of the spring provides a more evenly stressed structure. The primary and secondary springs may have different configurations from those described provided that they are arranged to provide similar functionality. The material used to form the springs 52 may vary according to application. The mounting of these springs is such that exposure to fire of an intensity sufficient to produce substantial reduction in the wall strength of the vessel will bring the central coiled portion of the spring to a bright red heat easily sufficient to destroy the spring temper of most conventional spring steels. By selection of other resilient alloys, a spring could be provided which will lose its spring temper at a substantially lower temperature.

I claim:

1. In an emergency pressure relief valve for a vessel containing pressurised fluid comprising a valve body defining a valve passage through the body from a first end communicating with the interior of the vessel to a second end communicating with the ambient atmosphere, a valve seat within and surrounding the passage, a flap valve, a shaft supporting the flap valve for rotation about an axis perpendicular to a longitudinal axis of the passage between a first position closing the passage and in fluid tight engagement with the valve seat and a second position within the body in which it does not substantially obstruct the passage, and spring means acting between the shaft and the body to urge the flap valve into said first position with a torque sufficient to retain the flap valve in said first position when the pressure difference between the first and second ends of the passage is less than a predetermined value; the improvement wherein said spring means includes at least one spring disposed for exposure to the thermal ambience of the vessel to which the valve is applied, the spring being made of a material which loses its spring temper on exposure to a thermal ambience likely to result in substantial weakening of walls of the pressure vessel, whereby substantially to reduce the closing torque applied by said spring means to the valve after exposure of the spring to such a thermal ambience.

2. A valve according to claim 1, wherein said spring means comprises multiple springs acting in parallel on said flap including at least one first spring which is the spring exposed to the thermal ambience of the vessel, and at least one further spring sufficiently protected from the thermal ambience of the vessel to maintain a predetermined minimum closing torque on said flap valve after said first spring has lost its spring temper.

3. A valve according to claim 2, wherein said at least one first spring has a characteristic and is so mounted that the closing force exerted thereby initially increases but does not increase after an initial angular movement of the flap from the first position towards the second position, and the at least one further spring exerts a lesser but steadily increasing closing torque during angular movement of the flap from the first position towards the second position.

4. A valve according to claim 2, wherein at least one first arm is attached to said shaft, externally of the body, at least one second arm is pivotally connected to the exterior of said body, adjustment means are provided to control the angular relationship of said second arm to the body, and said at least one first spring is a tension spring connected between said first and second arms externally of said body.

5. A valve according to claim 4, wherein each first arm defines a longitudinal slot, and a connection to the associated first spring slides in the slot, the relationship of the arms to each other and to the flap being such that as the flap opens, the spring is extended, but after an initial opening phase, the angle between the arms increases and the connection slides in the slot to prevent further increase in the closing torque applied by the first spring to the flap.

6. A valve according to claim 2, wherein the at least one further spring is located within the valve body.

7. A valve according to claim 6, wherein the at least one further spring is concentric with the shaft.

8. A valve according to claim 2, wherein each first spring is a coiled tension spring with end loops for attachment to the remainder of the valve, the only thermal contact with the valve being through the loops.

9. A valve according to claim 1, wherein the axis of the shaft is to one side of the passage.

10. A valve according to claim 1, wherein the valve seat is of heat resistant material, and defines an annular recess for an O-ring providing a primary seal with the flap.

* * * * *